(12) United States Patent
Satake

(10) Patent No.: US 10,260,448 B2
(45) Date of Patent: Apr. 16, 2019

(54) FUEL INJECTION CONTROL DEVICE FOR INTERNAL COMBUSTION ENGINE

(71) Applicant: DENSO CORPORATION, Kariya, Aichi-pref. (JP)

(72) Inventor: Nobuyuki Satake, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/759,584

(22) PCT Filed: Sep. 7, 2016

(86) PCT No.: PCT/JP2016/076239
§ 371 (c)(1),
(2) Date: Mar. 13, 2018

(87) PCT Pub. No.: WO2017/051707
PCT Pub. Date: Mar. 30, 2017

(65) Prior Publication Data
US 2018/0258877 A1   Sep. 13, 2018

(30) Foreign Application Priority Data

Sep. 24, 2015 (JP) ................................. 2015-187256

(51) Int. Cl.
*B60T 7/12* (2006.01)
*F02D 41/40* (2006.01)
(Continued)

(52) U.S. Cl.
CPC ............. *F02D 41/40* (2013.01); *F02D 41/20* (2013.01); *F02D 41/34* (2013.01); *F02D 45/00* (2013.01);
(Continued)

(58) Field of Classification Search
CPC .......... B60W 2510/0623; F02D 19/023; F02D 19/024; F02D 19/0605; F02D 19/0607;
(Continued)

(56) References Cited

U.S. PATENT DOCUMENTS

2011/0120423 A1   5/2011   Borchsenius et al.
2016/0237935 A1*  8/2016   Tanaka ................... F02D 41/247
(Continued)

FOREIGN PATENT DOCUMENTS

JP          57-13843        1/1982
WO   WO 2013/191267   12/2013

*Primary Examiner* — John Kwon
(74) *Attorney, Agent, or Firm* — Nixon & Vanderhye P.C.

(57) ABSTRACT

An ECU includes an injection controller that performs a partial lift injection in which a fuel injection valve is drivingly opened by an injection pulse by which a lift amount of a valve body of the fuel injection valve does not reach a full lift position, a first calculation section that calculates a first parameter correlated with an amount of induced electromotive force generated by a magnetic flux change during movement of the valve body to a closed position after OFF of the injection pulse of the partial lift injection, a second calculation section that calculates, based on a time-series change of the induced electromotive force after OFF of the injection pulse of the partial lift injection, a second parameter correlated with a voltage inflection point generated with reaching of the valve body to the closed position, and a correction section that corrects a time length of the injection pulse based on the first parameter and the second parameter.

5 Claims, 9 Drawing Sheets

(51) Int. Cl.
*F02D 41/20* (2006.01)
*F02M 51/04* (2006.01)
*F02D 41/34* (2006.01)
*F02M 57/02* (2006.01)
*F02D 45/00* (2006.01)
F02D 41/38 (2006.01)
F02M 51/06 (2006.01)

(52) U.S. Cl.
CPC ............ *F02M 51/04* (2013.01); *F02M 57/02* (2013.01); *F02D 2041/2051* (2013.01); *F02D 2041/389* (2013.01); *F02M 51/061* (2013.01); *Y02T 10/44* (2013.01)

(58) Field of Classification Search
CPC ... F02D 19/061; F02D 31/007; F02D 35/0046
USPC ......... 701/103–105, 114; 123/434, 445, 472, 123/478, 479
See application file for complete search history.

(56) References Cited

U.S. PATENT DOCUMENTS

| | | | |
|---|---|---|---|
| 2016/0237937 A1* | 8/2016 | Kusakabe | F02D 41/20 |
| 2016/0245211 A1* | 8/2016 | Katsurahara | F02D 41/20 |
| 2018/0017005 A1* | 1/2018 | Kusakabe | F02D 41/20 |
| 2018/0209370 A1* | 7/2018 | Moriyama | F02D 45/00 |
| 2018/0223766 A1* | 8/2018 | Nakano | F02D 41/20 |

* cited by examiner

FUEL INJECTION CONTROL DEVICE FOR INTERNAL COMBUSTION ENGINE

CROSS REFERENCE TO RELATED APPLICATION

This application is the U.S. national phase of International Application No. PCT/JP2016/076239 filed on Sep. 7, 2016 which designated the U.S. and claims priority to Japanese Patent Application No. 2015-187256 filed on Sep. 24, 2015, the entire contents of each of which are hereby incorporated by reference.

TECHNICAL FIELD

The present disclosure relates to a fuel injection control device for an internal combustion engine.

BACKGROUND ART

As a fuel injection valve that injects and supplies fuel to each cylinder of an internal combustion engine mounted on a vehicle of the like, for example, an electromagnetically driven type has been known. In such a type of fuel injection valve, fuel injection period and fuel injection amount are controlled by controlling energization period and energization timing of a solenoidal coil embedded in a fuel injection valve body to drive a valve body in a valve opening direction.

Furthermore, in order to meet a requirement of the micro injection, a partial lift injection in which a lift amount of a valve body of a fuel injection valve dose not reach a full lift position has been studied recently, and for example, a technique of Patent Literature 1 has been known as a technique for solving variation of injection amount in the partial lift injection. In the technique described in Patent Literature 1, a terminal voltage of a solenoid is detected for each of fuel injection valves of cylinders. Then, in a case where the valve body is closed from a valve opened state, induced electromotive force is changed due to change of acceleration of a mover when the mover is separated from the valve body after being in contact with a valve seat. In this case, the timing at which a second order differential value of the terminal voltage of the solenoid is determined as a valve closing timing of the valve body to appreciate injection amount variation on the basis of the valve closing timing.

However, as described above, in a case where the induced electromotive force is changed when the valve body is closed from a valve opened state, when the valve closing timing is determined on the basis of the second order differential value of the terminal voltage of the solenoid, to correctly determine the valve opening timing probably fails except the area in which the valve body lift amount is large to some extent, in other words, except the area in which an injection pulse width is long to some extent. In this case, micro injection is performed in the partial lift injection, but determination of the valve closing timing of the valve body in the micro injection is difficult, so that probably there is room for technical improvement.

PRIOR ART LITERATURES

Patent Literature

Patent Literature 1: WO 2013/191267 A1

SUMMARY OF INVENTION

It is an object of the present disclosure to provide a fuel injection control device for an internal combustion engine capable of controlling fuel injection amount with high accuracy in a partial lift injection.

According to an aspect of the present disclosure, a fuel injection control device for an internal combustion engine equipped with a fuel injection valve of an electromagnetically driven type includes an injection controller that performs a partial lift injection in which the fuel injection valve is drivingly opened by an injection pulse by which a lift amount of a valve body of the fuel injection valve does not reach a full lift position, a first calculation section that calculates a first parameter correlated with an amount of induced electromotive force generated by a magnetic flux change during movement of the valve body to a closed position after OFF of the injection pulse of the partial lift injection, a second calculation section that calculates, based on a time-series change of the induced electromotive force after OFF of the injection pulse of the partial lift injection, a second parameter correlated with a voltage inflection point generated with reaching of the valve body to the closed position, and a correction section that corrects a time length of the injection pulse based on the first parameter and the second parameter.

When the valve body of the fuel injection valve of an electromagnetically driven type is moved from an opened position to the closed position, induced electromotive force generates with change of a magnetic flux in a magnetic circuit, and the induced electromotive force is superimposed with the terminal voltage of the fuel injection valve. In this context, the induced electromotive force increases in accordance with the change of the magnetic flux in the magnetic circuit, and the induced electromotive force amount differs depending on a lift position of the valve body in a partial lift injection. Consequently, monitoring the induced electromotive force amount makes it possible to obtain deviation of injection amount caused by variation of the valve body lift amount in the partial lift injection. Furthermore, when the valve body reaches the closed position, the movement of the valve body is stopped to cause variation of inclination of change of the induced electromotive force. That is, a voltage inflection point generates in the terminal voltage of the fuel injection valve. By calculating the voltage inflection point, deviation of the injection amount caused by variation of valve closing timing of the valve body can be obtained.

The first parameter correlated with the induced electromotive force may include an error due to variation by a tolerance in the magnetic circuit or a driving circuit of the fuel injection valve as a disturbance when the induced electromotive force amount is obtained. However, the first parameter allows the induced electromotive force amount to be obtained without causing lowering in accuracy even in an area in which a valve body lift amount is relatively small. In contrast, the second parameter correlated with the voltage inflection point is calculated on the basis of a time-series change of the induced electromotive force although calculation accuracy is lowered because change of the induced electromotive force amount becomes small in the area in which the valve body lift amount is relatively small. Thus, the second parameter is less likely to be affected by variation by a tolerance in the magnetic circuit or the driving circuit of the fuel injection valve.

In the above configuration, by calculation methods of respective different types, the first parameter correlated with the induced electromotive force amount and the second parameter correlated with the voltage inflection point are calculated, and the time length of the injection pulse is corrected on the basis of the first parameter and the second parameter, which makes it possible to suppress lowering in accuracy in the case where correction is performed on the basis of the first parameter by combining the correction based on the second parameter. That is, in the correction based on the first parameter, there is a concern of lowering in accuracy due to variation in tolerance of the magnetic circuit or the driving circuit, but the above-mentioned lowering in accuracy can be suppressed by combining the correction based on the second parameter. This makes it possible to control fuel injection amount with a high accuracy in the partial lift injection.

BRIEF DESCRIPTION OF DRAWINGS

The above and other aspects, features and advantages of the present disclosure will become more apparent from the following detailed description made with reference to the accompanying drawings.

EMBODIMENT FOR CARRYING OUT INVENTION

Figure 1:
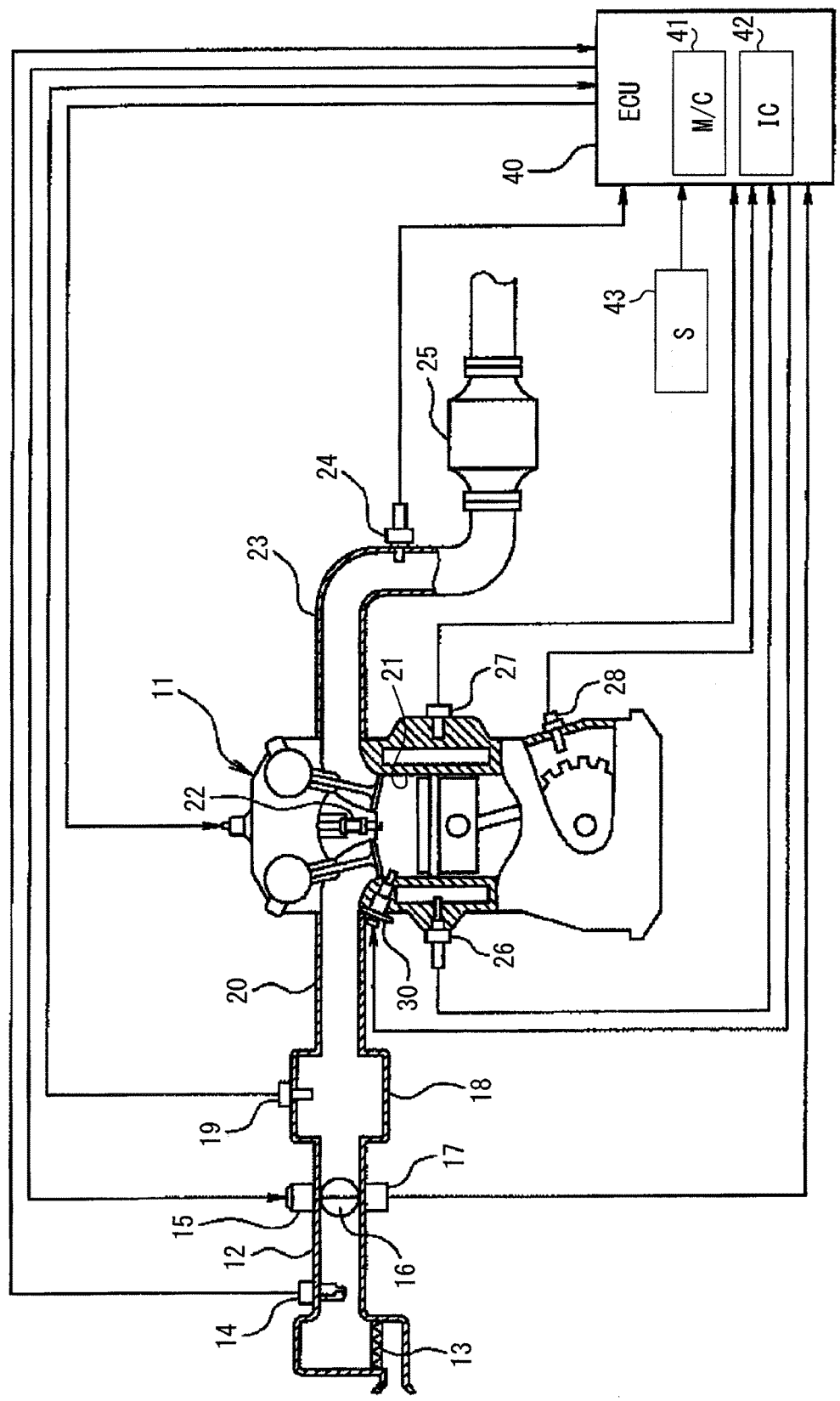
FIG. 1 is a diagram illustrating a schematic configuration of an engine control system.

Hereinafter, an embodiment embodying the present disclosure will be described on the basis of the drawings. The present embodiment embodies a control system that controls a gasoline engine for a vehicle. First, a schematic configuration of an engine control system will be described on the basis of FIG. 1.

An air cleaner 13 is provided on a most upstream unit of an intake pipe 12 of an engine 11 that is a multi-cylinder internal combustion engine of a direct injection type, and an air flow meter 14 that detects an intake air amount is provided on a downstream side of the air cleaner 13. On the downstream side of the air flow meter 14, a throttle valve 16 that is adjusted in its opening by a motor 15, and a throttle opening sensor 17 that detects an opening (throttle opening) of the throttle valve 16 are provided.

A surge tank 18 is provided on the downstream side of the throttle valve 16, and an intake pipe pressure sensor 19 that detects an intake pipe pressure is provided on the surge tank 18. An intake manifold 20 that introduces air to each cylinder 21 of the engine 11 is connected to the surge tank 18, and a fuel injection valve 30 of an electromagnetically driven type that directly injects fuel in each cylinder is attached to each cylinder 21 of the engine 11. A spark plug 22 is attached on a cylinder head of the engine 11 for each cylinder 21, and air-fuel mixture in the cylinder is ignited by spark discharge by the spark plug 22 of each cylinder 21.

An exhaust gas sensor 24 such as an air-fuel ratio sensor or an oxygen sensor that detects the air-fuel ratio, rich-lean, or the like of air-fuel mixture on the basis of exhaust gas is provided on an exhaust pipe 23 of the engine 11. A catalyst 25 such as a three-way catalyst that purifies exhaust gas is provided on the downstream side of the exhaust gas sensor 24.

A cooling water temperature sensor 26 that detects cooling water temperature and a knock sensor 27 that detects knocking are attached on a cylinder block of the engine 11. A crank angle sensor 28 that outputs a pulse signal for each predetermined crank angle rotation of a crank shaft is attached on an outer periphery side of the crank shaft, and a crank angle and an engine rotation speed are detected on the basis of a crank angle signal of the crank angle sensor 28. Outputs from the various sensors are sequentially input to an ECU 40.

An ECU 40 is an electronic control unit that is mainly composed of a microcomputer, and performs various control of the engine 11 on the basis of detection signals of the various sensors using control program stored in an embedded ROM (storage medium). The ECU 40 corresponds to a fuel injection control device. The ECU 40 calculates fuel injection amount that depends on an engine operating state to control fuel injection of the fuel injection valve 30 as well as an ignition timing of the spark plug 22.

To be more specific as to the fuel injection control, the ECU 40 includes a microcomputer 41 for engine control that performs fuel injection control and a driving IC 42 for driving the fuel injection valve. The microcomputer 41 calculates a required injection amount on the basis of an engine operating state such as an engine rotation speed and an engine load, calculates an injection pulse width (injection time) on the basis of the required injection amount, and transmits the injection pulse width to the driving IC 42. The driving IC 42 drivingly opens the fuel injection valve 30 by an injection pulse generated on the basis of the injection pulse width to inject fuel by the required injection amount.

A voltage sensor 43 that detects a negative terminal voltage is provided on the fuel injection valve 30, and detected results of the voltage sensor 43 are sequentially transmitted to the ECU 40.

Figure 2A:
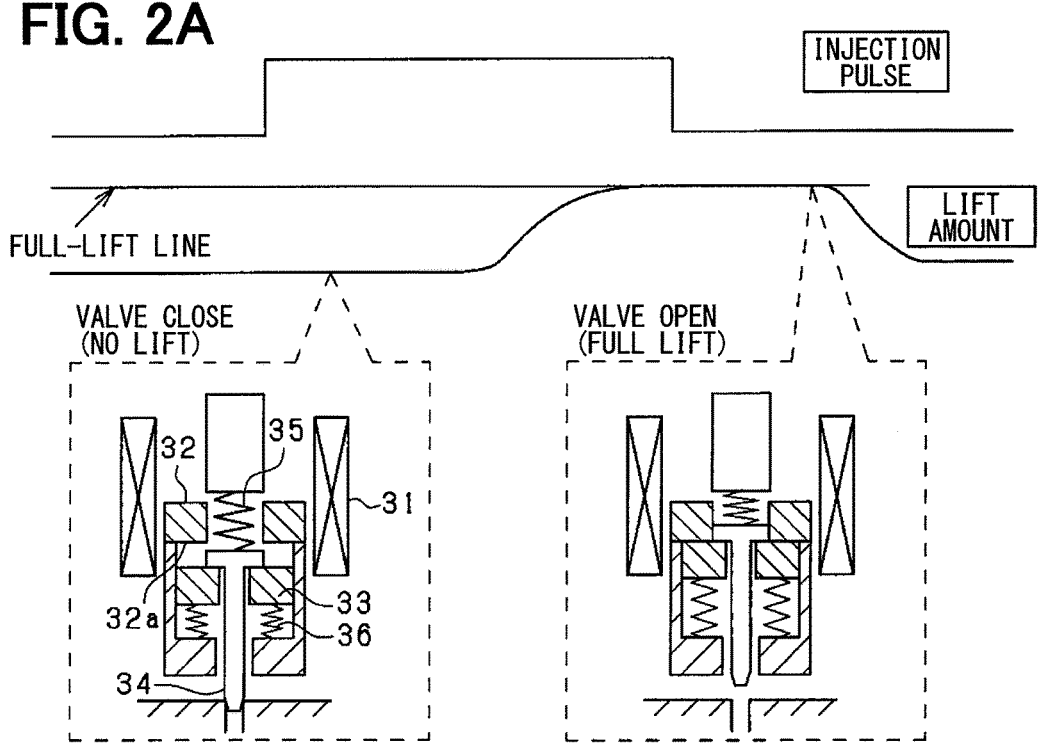
FIG. 2A is a diagram illustrating a full lift state of a fuel injection valve.

In the present embodiment, as a driving mode of the fuel injection valve 30, lifting of the valve body is finished in a partial lift state, which is a state before the valve body of the fuel injection valve 30 reaches a full lift position, and a partial lift injection in which a predetermined amount of fuel is injected in this state is performed. The partial lift injection will be simply described with reference to FIGS. 2A and 2B. FIG. 2A illustrates operation during full lift injection, and FIG. 2B illustrates operation during partial lift injection.

Figure 2B:
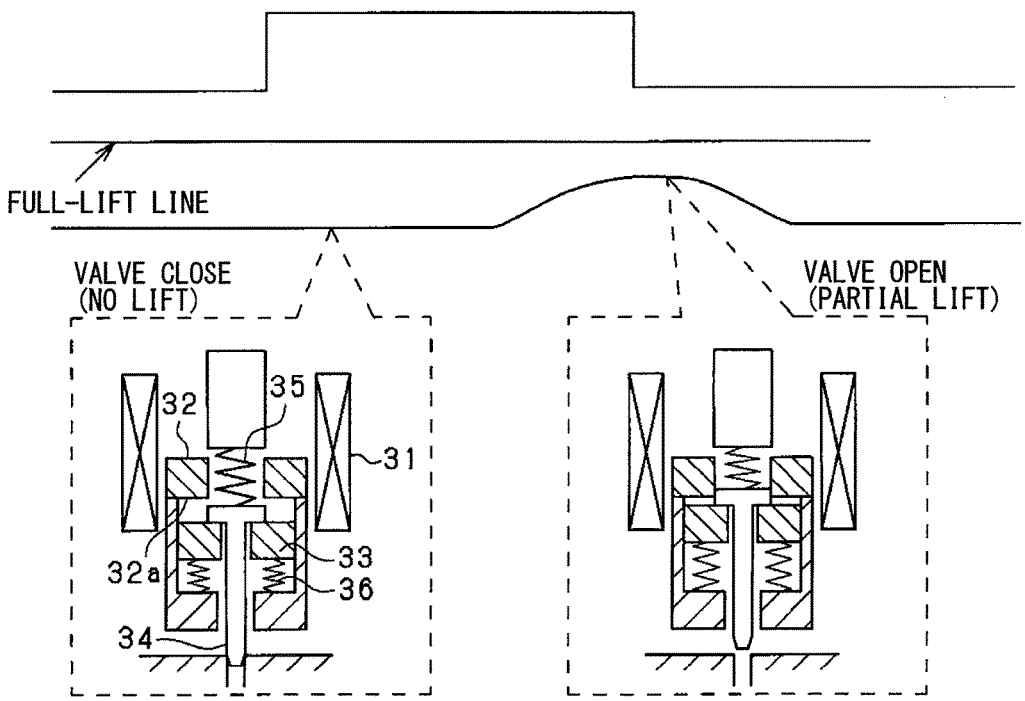
FIG. 2B is a diagram illustrating a partial lift state of the fuel injection valve.

As illustrated in FIG. 2A and FIG. 2B, the fuel injection valve 30 includes a coil 31 as an electromagnetic unit that generates an electromagnetic force by energization, a fixed core 32 composed of a magnetic body, a movable core 33 composed of a magnetic body that is attracted on the side of the fixed core 32 by an electromagnetic force, a valve body 34 that has a needle shape and that is integrally driven with the movable core 33, a first spring 35 that biases the valve body 34 in a valve closing direction, and a second spring 36 that biases the movable core 33 in a valve anti-closing direction. By movement of the valve body 34 away from a valve seat to the valve opening position with energization of the coil 31, the fuel injection valve 30 enters a valve opened state, so that fuel injection is performed. The biasing force of the second spring 36 is set smaller than the biasing force of the first spring 35.

In FIGS. 2A and 2B, the injection pulse widths (energization periods) are different, and when the injection pulse width is relatively long as illustrated in FIG. 2A, that is, when the valve body lift amount becomes a full lift amount, the valve body 34 reaches a full lift position at which the movable core 33 is bumped against a stopper 32a on the side of the fixed core 32. In contrast, as illustrated in FIG. 2B, when the injection pulse width is relatively short, that is, when the valve body lift amount is a partial lift amount, the valve body 34 is in a state before the movable core 33 is bumped against the stopper 32a, and enters a partial lift state in which the valve body 34 does not reach the full lift position. Then, when the energization of the coil 31 is stopped with falling of the injection pulse, the fuel injection valve 30 enters a valve closed state by returning of the movable core 33 and the valve body 34 to valve closed positions, resulting in stoppage of fuel injection. Since the movable core 33 and the valve body 34 are composed of different elements, when the valve body 34 reaches the closed position, the valve body 34 is held at the closed position, whereas the movable core 33 moves on a distal end side by itself.

Figure 3:
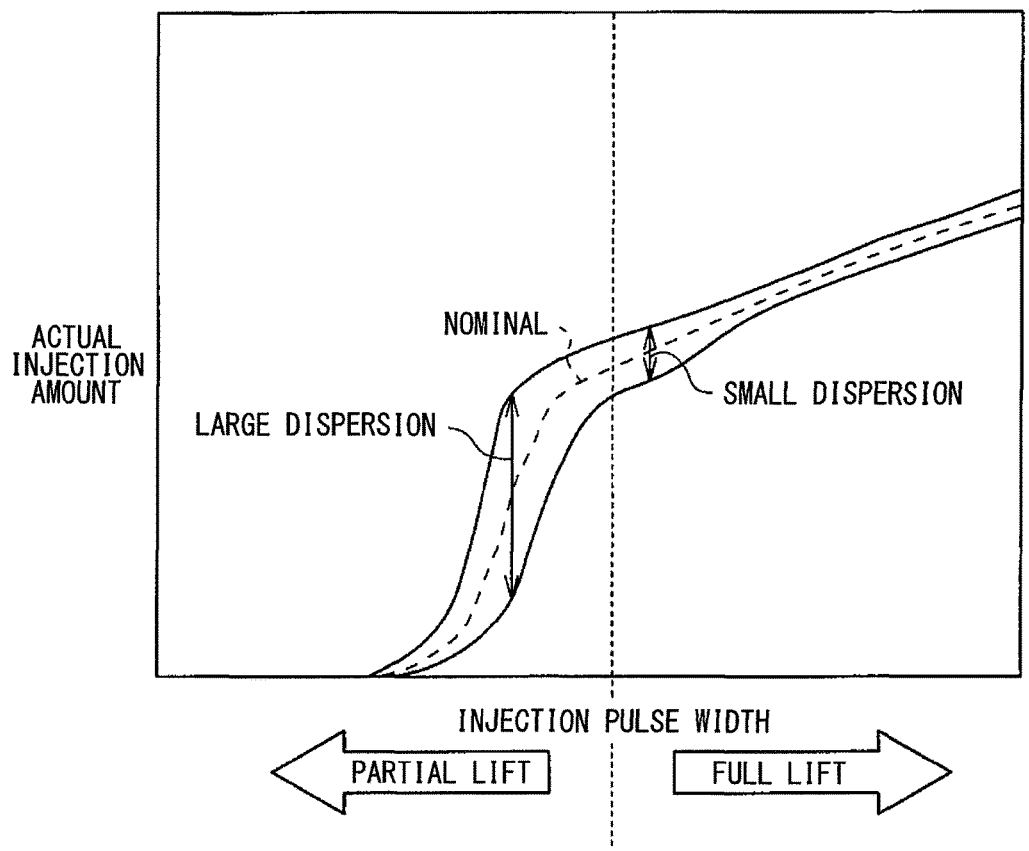
FIG. 3 is a diagram illustrating a relation between an injection pulse width and an actual injection amount of the fuel injection valve.

In the fuel injection valve 30, as illustrated in FIG. 3, a linearity of a change characteristic of real injection amount with respect to injection pulse width tends to be worse in a partial lift area, that is, in an area that is in a partial lift state in which the lift amount of the valve body 34 does not reach the full lift position because the injection pulse width is short. In the partial lift area, variation in the lift amount of the valve body 34 tends to be large to increase variation in the injection amount, and when the variation in the injection amount is large, exhaust emission and drivability can be deteriorated.

In the engine 11 of a direct injection type, for example, it is required to perform a micro injection when multi stage injection is performed, and a partial lift injection is performed when the micro injection is performed. However, in this case, the injection amount variation tends to occur in the partial lift area as described above, so that it is necessary to correct the injection pulse in accordance with the injection amount variation. Therefore, in the present embodiment, to sense the injection amount variation in the micro injection, variation learning for calculating a learning value corresponding to the injection amount variation is performed. Then, the injection pulse width is corrected by using the learning value.

The present embodiment especially focuses on factors of the injection amount variation that are a factor due to variation in the valve body lift amount of the fuel injection valve 30 (that is, the maximum lift amount in the partial lift injection) and a factor due to variation in valve closing timing, and the learning value is calculated using the two factors.

In other words, when the movable core 33 and the valve body 34 move from the valve opened position to the valve closed position with OFF of the injection pulse in the fuel injection valve 30, a change of magnetic flux generates in a magnetic circuit including the coil 31, the fixed core 32, and the movable core 33, and an induced electromotive force generates in accordance with the change of the magnetic flux. This induced electromotive force is superimposed with a negative terminal voltage of the fuel injection valve 30. In this case, when the valve body lift amount in the partial lift injection is different, the magnitude of the induced electromotive force (induced electromotive force amount) is changed due to change in the magnitude of the magnetic flux. That is, there is a correlation between the valve body lift amount and the induced electromotive force amount. Therefore, when the partial lift injection is performed, after OFF of the injection pulse, a first parameter correlated with the induced electromotive force amount is calculated, and the injection pulse width is corrected on the basis of the first parameter.

On the other hand, when the valve body 34 of the fuel injection valve 30 is transitioned from an opened state to a closed state, the valve body 34 and the movable core 33 are integrally operated until the valve body 34 reaches the valve closed position, and only the movable core 33 is operated alone after the valve body 34 reaches the valve closed position. In this case, a difference occurs in behavior (movement acceleration) of the movable core 33 between before and after arrival of the valve body 34 to the valve closed position, which affects change in the induced electromotive force, resulting in change in the negative terminal voltage of the fuel injection valve 30. That is, there is a correlation between a voltage inflection point in the negative terminal voltage of the fuel injection valve 30 and a valve closing timing of the fuel injection valve 30, so that the valve closing timing can be sensed by the voltage inflection point of the fuel injection valve 30. Therefore, when performing the partial lift injection, after OFF of the injection pulse, a second parameter correlated with the voltage inflection point in the negative terminal voltage of the fuel injection valve 30 is calculated, and the injection pulse width is corrected on the basis of the second parameter.

When the movable core 33 and the valve body 34 are not separately composed but integrally composed in the fuel injection valve 30, change in the induced electromotive force is still affected between before and after arrival of the valve body 34 to the valve closed position. Accordingly, correction of the injection pulse width is possible on the basis of change in the induced electromotive force.

Figure 4:
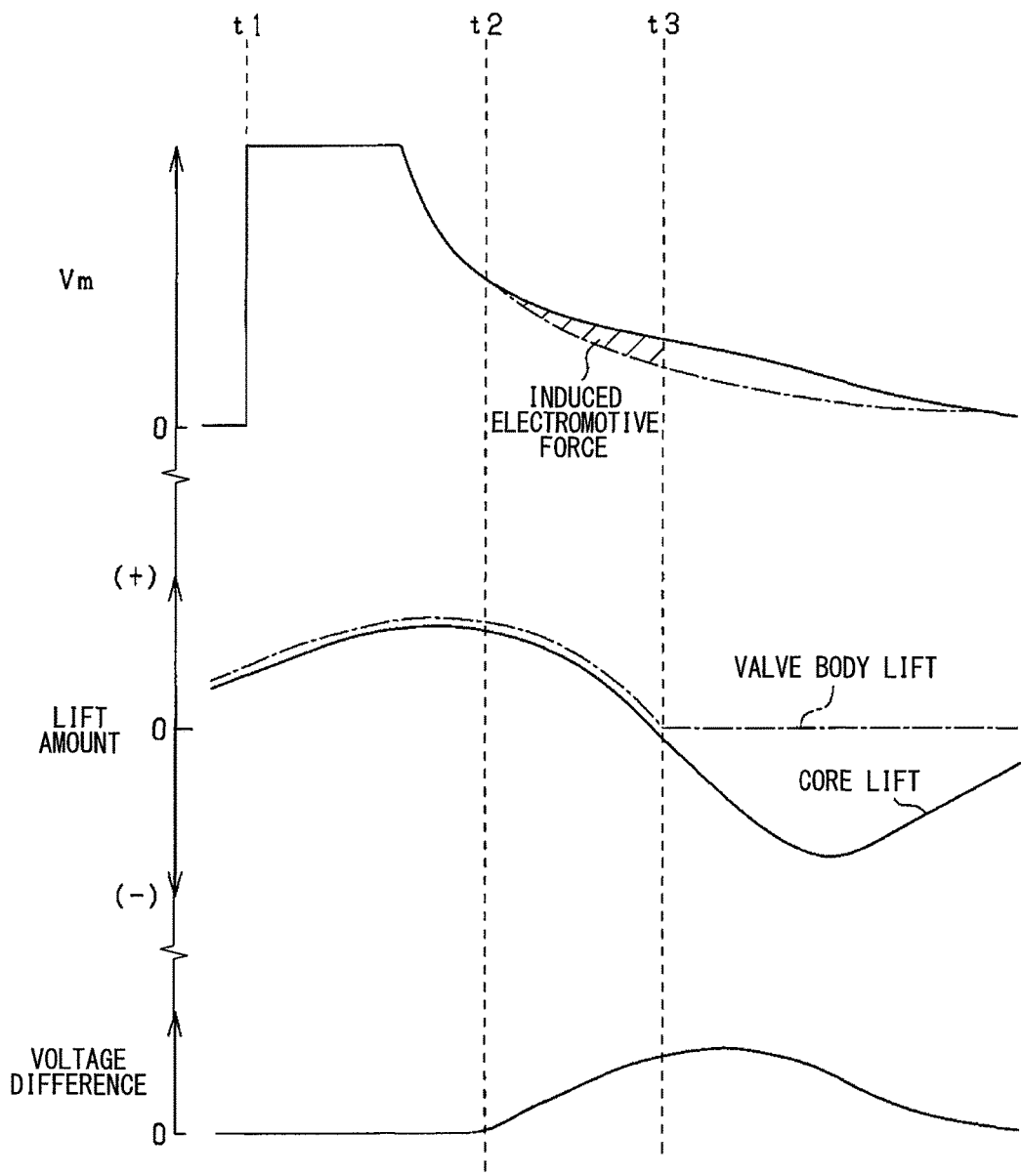
FIG. 4 is a time chart illustrating behaviors after OFF of an injection pulse in the fuel injection valve.

FIG. 4 is a time chart for illustrating the behavior after OFF of the injection pulse in the fuel injection valve 30. FIG. 4 illustrates that the injection pulse of the partial lift injection is made OFF at a timing t1 to cause a tail voltage in the negative terminal of the fuel injection valve 30. As the lift amount, the core lift amount of the movable core 33 is illustrated by a solid line, and the valve body lift amount is illustrated by a dashed-dotted line.

In FIG. 4, when energization to the coil 31 is stopped by OFF of the injection pulse at a timing t1, the negative terminal voltage Vm of the fuel injection valve 30 is increased as illustrated in the drawing. Then, the negative terminal voltage Vm is reduced in accordance with the change of the core lift amount on the decreased side. In this context, an induced electromotive force is superimposed with the negative terminal voltage Vm after a timing t2, and the induced electromotive force amount depends on a peak value of the core lift amount (the same applies to a peak value of the valve body lift amount). The magnitude of the induced electromotive force amount is illustrated as a voltage difference.

Then, when the valve body 34 reaches the valve closed position at a timing t3, the movable core 33 thereafter moves independently. In this context, the induced electromotive force gradually increases after the timing t2, and the increase rate of the induced electromotive force decreases at the timing t3 that is a valve closing timing. That is, movement acceleration of the movable core 33 changes between before and after the timing t3, and the timing t3 is a voltage inflection point of the negative terminal voltage Vm.

Figure 5:
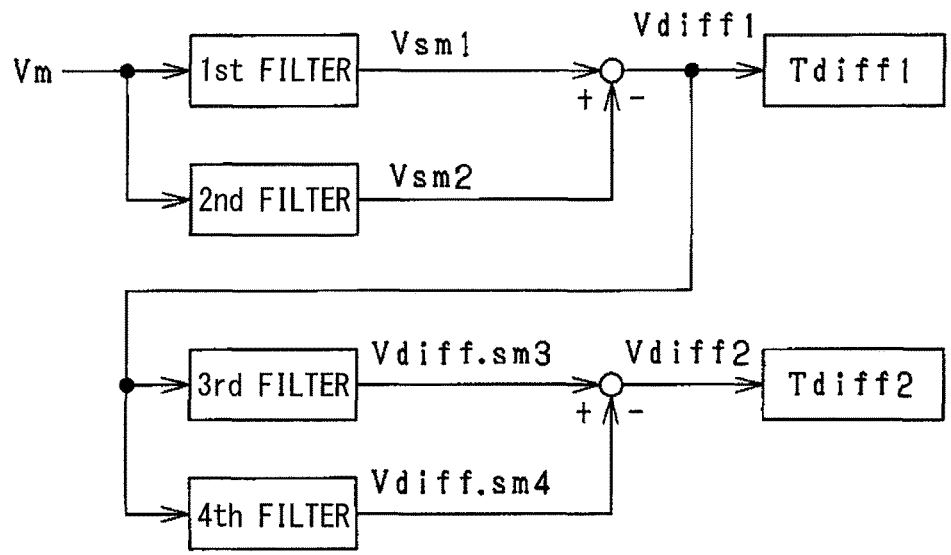
FIG. 5 is a function block diagram illustrating a calculation procedure of an electromotive force arrival time Tdiff1 and a voltage inflection point time Tdiff2.

The present embodiment focuses on the above-mentioned behavior illustrated in FIG. 4, and the negative terminal voltage Vm of the fuel injection valve 30 is acquired after OFF of the injection pulse for the partial lift injection, an electromotive force measurement time Tdiff1 is calculated as an index (first parameter) indicating the variation in the valve body lift amount of the fuel injection valve 30, and a voltage inflection point time Tdiff2 is calculated as an index (second parameter) indicating the variation of the valve closing timing, based on the negative terminal voltage Vm. A calculation procedure of the electromotive force measurement time Tdiff1 and the voltage inflection point time Tdiff2 will be described with reference to FIG. 5.

After OFF of the injection pulse of the partial lift injection, the ECU 40 calculates a first filter voltage Vsm1 by subjecting the negative terminal voltage Vm of the fuel injection valve 30 to filter processing (smoothing processing) by a first low pass filter whose cutoff frequency is a first frequency f1 lower than the frequency of a noise component, and calculates a second filter voltage Vsm2 by subjecting the negative terminal voltage Vm to filter processing (smoothing processing) by a second low pass filter whose cutoff frequency is a second frequency f2 lower than the first frequency f1. The filter processing of the second low pass filter corresponds to "first smoothing processing", the first filter voltage Vsm1 corresponds to "non-smoothed value of the terminal voltage that is not subjected to the first smoothing processing", and the second filter voltage Vsm2 corresponds to "smoothed value of the terminal voltage that is subjected to the first smoothing processing".

Then, the ECU 40 calculates the difference Vdiff1 between the first filter voltage Vsm1 and the second filter voltage Vsm2 (=Vsm1−Vsm2), and calculates the time from a predetermined reference timing to when the difference Vdiff1 becomes a predetermined threshold value Vt as the electromotive force measurement time Tdiff1. The electromotive force measurement time Tdiff1 is a detection index that is changed depending on the valve body lift amount of the fuel injection valve 30, in other words, depending on the induced electromotive force amount generated depending on the valve body lift amount. The difference Vdiff1 is "an equivalent value of the induced electromotive force amount". The reference timing is, for example, an ON timing or an OFF timing of the injection pulse. The threshold value Vt is preferably calculated depending on fuel pressure, fuel temperature, or the like. Alternatively, the threshold value Vt may be a preliminarily set fixed value.

Furthermore, the ECU 40 calculates a third filter voltage Vdiff.sm3 by subjecting the difference Vdiff1 to filter processing (smoothing processing) by a third low pass filter whose cutoff frequency is a third frequency f3 lower than the frequency of a noise component, and calculates a fourth filter voltage Vdiff.sm4 by subjecting the difference Vdiff1 to filter processing (smoothing processing) by a fourth low pass filter whose cutoff frequency is a fourth frequency f4 lower than the third frequency f3. The filter processing of the fourth low pass filter corresponds to "second smoothing processing", the third filter voltage Vdiff.sm3 corresponds to "a non-smoothed value corresponding to first order difference that is not subjected to the second smoothing processing", and the fourth filter voltage Vdiff.sm4 corresponds to "a smoothed value corresponding to first order difference that is subjected to the second smoothing processing"

Then, the ECU 40 calculates the difference between the third filter voltage Vdiff.sm3 and the fourth filter voltage Vdiff.sm4 as a second order difference Vdiff2 (=Vdiff.sm3−Vdiff.sm4), and the timing when the second order difference Vdiff2 becomes an extreme value, that is, for example, the timing at which the second order difference Vdiff2 ceases from increasing is calculated as the voltage inflection point time Tdiff2 at which an inflection point generates in the difference Vdiff1. In this case, the time from a predetermined reference timing to the timing when the second order difference Vdiff2 becomes an extreme value is calculated as the voltage inflection point time Tdiff2. The voltage inflection point time Tdiff2 is a detection index that varies depending on a valve closing timing of the fuel injection valve 30, in other words, depending on a voltage inflection point that generates with a valve closure of the valve body 34. The reference timing is, for example, an ON timing or an OFF timing of the injection pulse.

Figure 6:
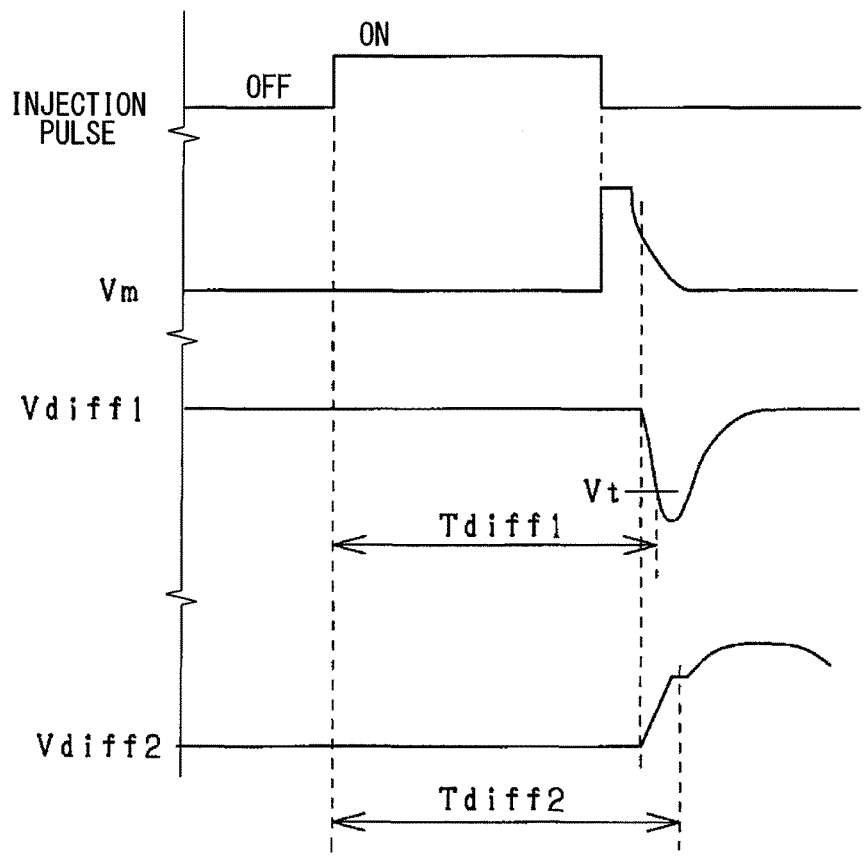
FIG. 6 is a time chart schematically illustrating calculation of the electromotive force measurement time Tdiff1 and the voltage inflection point time Tdiff2.

FIG. 6 is a time chart illustrating an overview of calculating the electromotive force measurement time Tdiff1 and the voltage inflection point time Tdiff2.

In FIG. 6, after OFF of the injection pulse, the difference Vdiff1 is calculated on the basis of the first filter voltage Vsm1 and the second filter voltage Vsm2 obtained by subjecting the negative terminal voltage Vm to filter processing, and the electromotive force measurement time Tdiff1 is calculated by comparison between the difference Vdiff1 and the threshold value Vt. Furthermore, the second order difference Vdiff2 is calculated on the basis of the third filter voltage Vdiff.sm3 and the fourth filter voltage Vdiff.sm4 obtained by subjecting the difference Vdiff1 to filter processing, and the voltage inflection point time Tdiff2 is calculated using a timing at which the second order difference Vdiff2 becomes an extreme value.

Incidentally, the induced electromotive force amount and the electromotive force measurement time Tdiff1 calculated on the basis of the induced electromotive force amount become possible to be calculated also in an area where the valve body lift amount (required lift amount) is small in the partial lift injection. However, there is a concern about decrease in accuracy because a tolerance or the like in the magnetic circuit or a driving circuit of the fuel injection valve 30 results in a disturbance. In contrast, it is concerned that the voltage inflection point time Tdiff2 calculated on the basis of time-series change of the negative terminal voltage Vm at valve closing timing is decreased in accuracy due to smallness of the moving speed of the valve body (that is, small change in the induced electromotive force amount) in an area in which the valve body lift amount in the partial lift injection is small. However, the relative amount of the time-series change is used as a parameter, so that the accuracy is prevented from being affected by the tolerance or the like in the magnetic circuit or the driving circuit.

In the present embodiment, in consideration of such a circumstance, the injection pulse width is corrected on the basis of the electromotive force measurement time Tdiff1 and the voltage inflection point time Tdiff2, in other words, on the basis of the induced electromotive force amount and the voltage inflection point. In this case, an injection amount learning value Δq with respect to a micro injection amount in the partial lift injection area is calculated as a pulse correction value used for correcting the injection pulse width.

Next, processing of injection amount learning by the ECU 40 will be described in detail. Herein, calculation processing of the electromotive force measurement time Tdiff1 (FIG. 7), calculation processing of the voltage inflection point time Tdiff2 (FIG. 8), and injection amount learning processing (FIG. 9) will be described. Each processing is repeatedly performed at a predetermined operation cycle by the ECU 40. At least the calculation processing of the electromotive force measurement time Tdiff1 and the calculation processing of the voltage inflection point time Tdiff2 among the above-mentioned processing are performed at an OFF time of the same injection pulse. That is, these two processing are performed in parallel at the same period.

Figure 7:
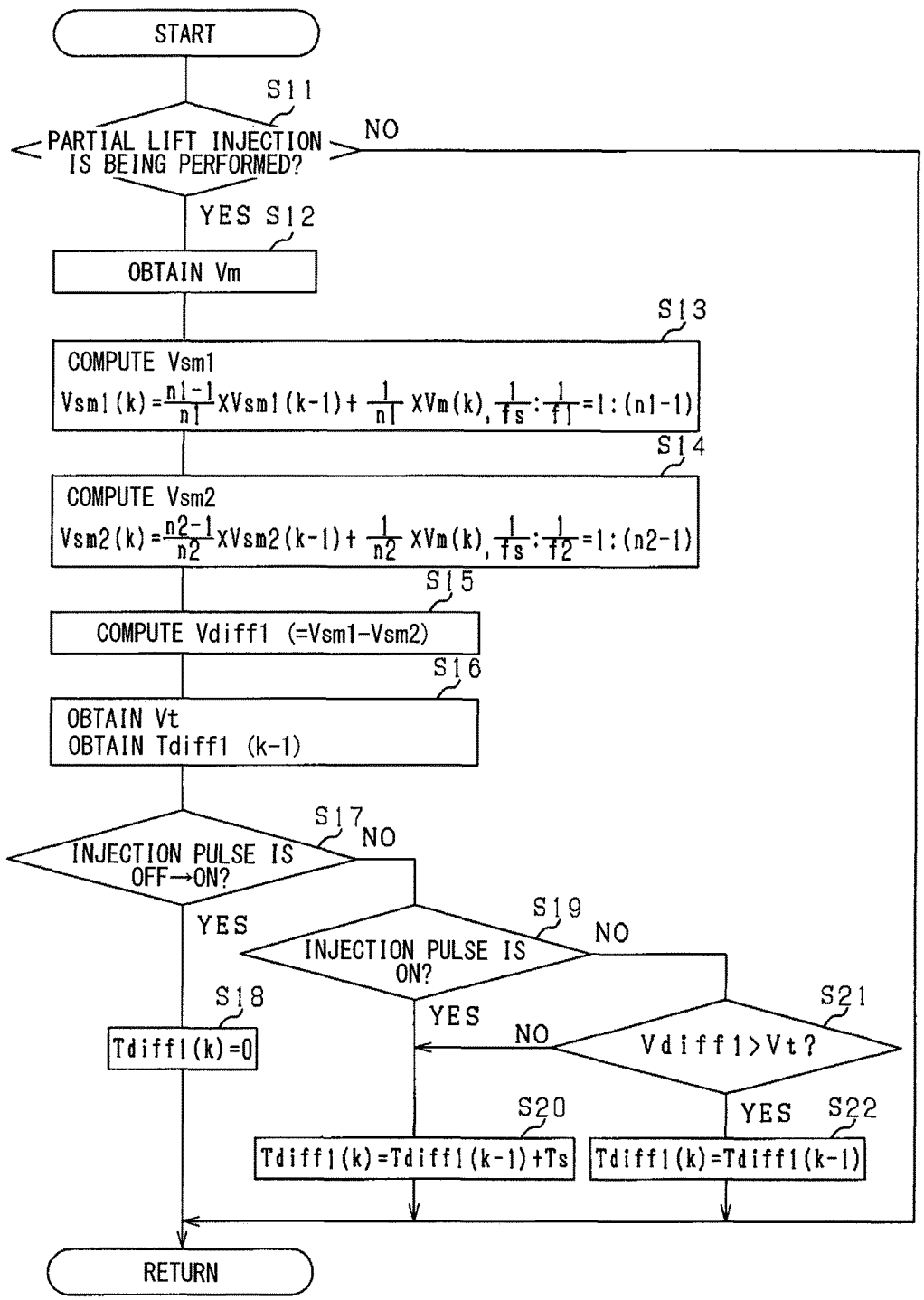
FIG. 7 is a flowchart illustrating calculation processing of the electromotive force measurement time Tdiff1.

First, in the calculation processing of the electromotive force measurement time Tdiff1 illustrated in FIG. 7, whether the partial lift injection is being performed is determined in step S11. Then, when the partial lift injection is being performed, the processing proceeds to step S12. In step S12, the negative terminal voltage Vm of the fuel injection valve 30 is acquired. In this case, the operation cycle of the processing is a sampling cycle Ts of the negative terminal voltage Vm.

Then, the processing proceeds to step S13, and the negative terminal voltage Vm is subjected to filter processing by the first low pass filter whose cutoff frequency is the first frequency f1 lower than the frequency of a noise component to calculate the first filter voltage Vsm1. The first low pass filter is a digital filter implemented by the following Formula (1) for obtaining a present value Vsm1(k) of the first filter voltage using a previous value Vsm1(k−1) of the first filter voltage and a present value Vm(k) of the negative terminal voltage.

$$Vsm1(k)=\{(n1-1)/n1\}\times Vsm1(k-1)+(1/n1)\times Vm(k) \quad (1)$$

A time constant n1 of the first low pass filter is set to satisfy the relation of the following Formula (2) using a sampling frequency fs (=1/Ts) of the negative terminal voltage Vm, and a cutoff frequency f1 of the first low pass filter.

$$1/fs:1/f1=1:(n1-1) \quad (2)$$

Then, the processing proceeds to step S14, and the negative terminal voltage Vm is subjected to filter processing by the second low pass filter whose cutoff frequency is the second frequency f2 lower than the first frequency f1 to calculate the second filter voltage Vsm2. The second low pass filter is a digital filter implemented by the following Formula (3) for obtaining a present value Vsm2(k) of the second filter voltage using a previous value Vsm2(k−1) of the second filter voltage and a present value Vm(k) of the negative terminal voltage.

$$Vsm2(k)=\{(n2-1)/n2\}\times Vsm2(k-1)+(1/n2)\times Vm(k) \quad (3)$$

A time constant n2 of the second low pass filter is set to satisfy the relation of the following Formula (4) using the sampling frequency fs(=1/Ts) of the negative terminal voltage Vm, and the cutoff frequency f2 of the second low pass filter.

$$1/fs:1/f2=1:(n2-1) \quad (4)$$

Then, the processing proceeds to step S15, and the difference Vdiff1 between the first filter voltage Vsm1 and the second filter voltage Vsm2 is calculated. Guard processing may be performed so that the difference Vdiff1 does not become more than "0" to extract only a negative component.

Then, the processing proceeds to step S16, a threshold value Vt is acquired, and a previous value Tdiff1(k−1) of the electromotive force measurement time is acquired.

Then, the processing proceeds to step S17, and whether it is a timing at which the injection pulse is switched from OFF to ON is determined. When it is determined that it is a timing at which the injection pulse is switched from OFF to ON, the processing proceeds to step S18, and the present time value Tdiff1(k) of the electromotive force measurement time is reset to "0".

In contrast, when it is determined that it is a timing at which the injection pulse is switched from OFF to ON, the processing proceeds to step S19, and whether the injection pulse is on is determined. When it is determined that the injection pulse is ON, the processing proceeds to step S20, and the present value Tdiff1(k) of the electromotive force measurement time is calculated by adding a predetermined value Ts that is an operation cycle of the processing to the previous value Tdiff1(k−1) of the electromotive force measurement time.

Furthermore, when it is determined that the injection pulse is not ON, the processing proceeds to step S21, and whether the difference Vdiff1 exceeds the threshold value Vt, that is, whether the difference Vdiff1 is changed from being smaller than to being larger than the threshold value Vt. When it is determined that the difference Vdiff1 has not yet exceeded the threshold value Vt, the processing proceeds to step S20, and the processing of adding the predetermined value Ts to the electromotive force measurement time Tdiff1 is continued.

Furthermore, when it is determined that the difference Vdiff1 has exceeded the threshold value Vt, it is determined that the calculation of the electromotive force measurement time Tdiff1 has been completed, and the processing proceeds to step S22, and the present value Tdiff1(k) of the electromotive force measurement time is held at the previous value Tdiff1(k−1). In this manner, the time from the reference timing at which the injection pulse is switched from OFF to ON to the timing when the difference Vdiff1 exceeds the threshold value Vt is calculated as the electromotive force measurement time Tdiff1, and the electromotive force measurement time Tdiff1 that is a calculated value is held until the next reference timing.

Figure 8:
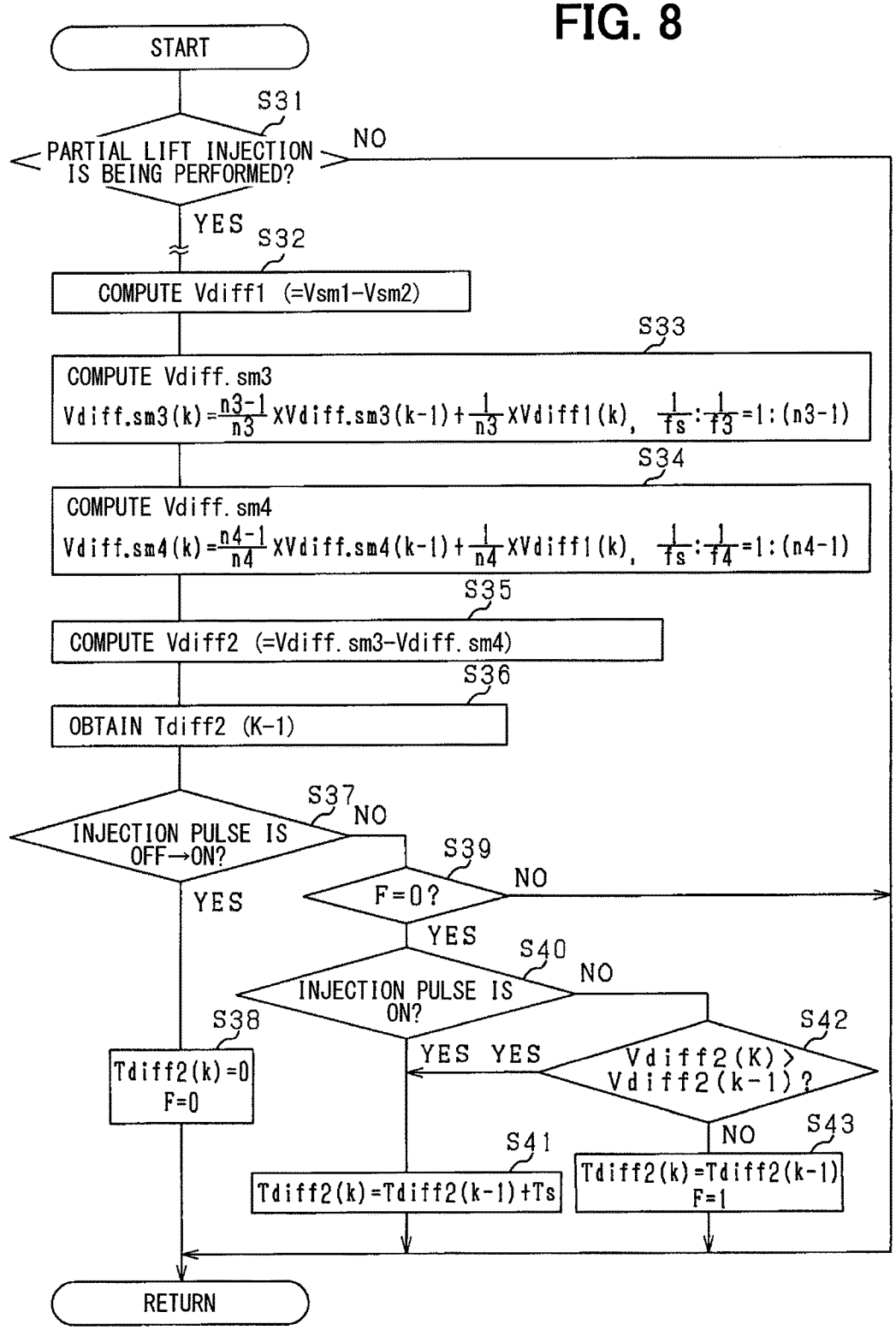
FIG. 8 is a flowchart illustrating calculation processing of the voltage inflection point time Tdiff2.

Next, in the calculation processing of the voltage inflection point time Tdiff2 illustrated in FIG. 8, whether the partial lift injection is being performed is determined in step S31. When the partial lift injection is being performed, the processing proceeds to the next step S32. In step S32, the difference Vdiff1 between the first filter voltage Vsm1 and the second filter voltage Vsm2 are calculated. The calculation processing of the difference Vdiff1 is the same processing as that in steps S12 to S15 in FIG. 7. When the processing of FIG. 7 and the processing of FIG. 8 are performed in parallel, the difference Vdiff1 calculated in the processing of FIG. 7 is acquired.

In step S33, the difference Vdiff1 is subjected to filter processing by the third low pass filter whose cutoff frequency is the third frequency f3 lower than the frequency of a noise component to calculate the third filter voltage Vdiff.sm3. The third low pass filter is a digital filter implemented by the following Formula (5) for obtaining a present value Vdiff.sm3(k) of the third filter voltage using a previous value Vdiff.sm3(k−1) of the third filter voltage and a present value Vdiff(k) of the difference.

$$Vdiff.sm3(k)=\{(n3-1)/n3\}\times Vdiff.m3(k-1)+(1/n3)\times Vdiff(k) \quad (5)$$

A time constant n3 of the third low pass filter is set to satisfy the relation of the following Formula (6) using the sampling frequency fs(=1/Ts) of the negative terminal voltage Vm, and the cutoff frequency f3 of the third low pass filter.

$$1/fs:1/f3=1:(n-1) \quad (6)$$

Then, the processing proceeds to step S34, and a fourth filter voltage Vdiff.sm4 is calculated by subjecting the difference Vdiff1 to filter processing by the fourth low pass filter whose cutoff frequency is the fourth frequency f4 lower than the third frequency f3. The fourth low pass filter is a digital filter implemented by the following Formula (7) for obtaining a present value Vdiff.sm4(k) of the fourth filter voltage using a previous value Vdiff.sm4(k-1) of the fourth filter voltage and the present value Vdiff(k) of the difference.

$$Vdiff.sm4(k)=\{(n4-1)/n4\} \times Vdiff.sm4(k-1)+(1/n4) \times Vdiff(k) \quad (7)$$

A time constant n4 of the fourth low pass filter is set to satisfy the relation of the following Formula (8) using the sampling frequency fs (=1/Ts) of the negative terminal voltage Vm, and the cutoff frequency f4 of the fourth low pass filter.

$$1/fs:1/f4=1:(n4-1) \quad (8)$$

The cutoff frequency f3 of the third low pass filter is set to a frequency higher than the cutoff frequency f1 of the first low pass filter, and the cutoff frequency f4 of the fourth low pass filter is set to a frequency lower than the cutoff frequency f2 of the second low pass filter. That is, the relation of f3>f1>f2>f4 is satisfied.

Then, the processing proceeds to step S35, and the difference between the third filter voltage Vdiff.sm3 and the fourth filter voltage Vdiff.sm4 is calculated as the second order difference Vdiff2. After that, the processing proceeds to step S36, and a previous value Tdiff2(k-1) of the voltage inflection point time is acquired.

Then, the process proceeds to step S37, and whether it is a timing at which the injection pulse is switched from ON to OFF is determined. When it is determined that it is a timing at which the injection pulse is switched from OFF to ON, the processing proceeds to step S38, and a present value Tdiff2(k) of the voltage inflection point time is reset to "0" and a completion flag F is reset to "0".

In contrast, when it is determined that it is not a timing at which the injection pulse is switched from ON to OFF, the processing proceeds to step S39, and whether the completion flag F is "0" is determined. When it is determined that the completion flag F is "0", the processing proceeds to step S40, and whether injection pulse is ON is determined. When it is determined that the injection pulse is ON, the processing proceeds to step S41, and the present value Tdiff2(k) of the voltage inflection point time is calculated by adding the predetermined value Ts that is the operation cycle of the processing to the previous value Tdiff2(k-1) of the voltage inflection point time.

When it is determined that the injection pulse is not ON, the processing proceeds to step S42, and whether the second order difference Vdiff2 is being increased is determined by determining whether the present value Vdiff2(k) of the second order difference is larger than the previous value Vdiff2(k-1) of the second order difference. When the second order difference Vdiff2 ceases to increase, it is determined that the second order difference Vdiff2 is an extreme value. When it is determined that the present value Vdiff2(k) of the second order difference is larger than the previous value Vdiff2(k-1) of the second order difference, that is, when it is determined that the second order difference Vdiff2 is being increased, the processing proceeds to step S41, and the processing of adding the predetermined value Ts to the voltage inflection point time Tdiff2 is continued.

When it is determined that the present value Vdiff2(k) of the second order difference is not less than the previous value Vdiff2(k-1) of the second order difference, it is determined that calculation of the voltage inflection point time Tdiff2 is completed and the processing proceeds to step S43, and the present value Tdiff2(k) of the voltage inflection point time is held to the previous value Tdiff2(k-1) and the completion flag F is set to "1". In this manner, the time from the reference timing at which the injection pulse is switched from OFF to ON to the timing at which the second order difference Vdiff2 becomes an extreme value is calculated as the voltage inflection point time Tdiff2, and the calculated value of the voltage inflection point time Tdiff2 is held until the next reference timing.

Figure 9:
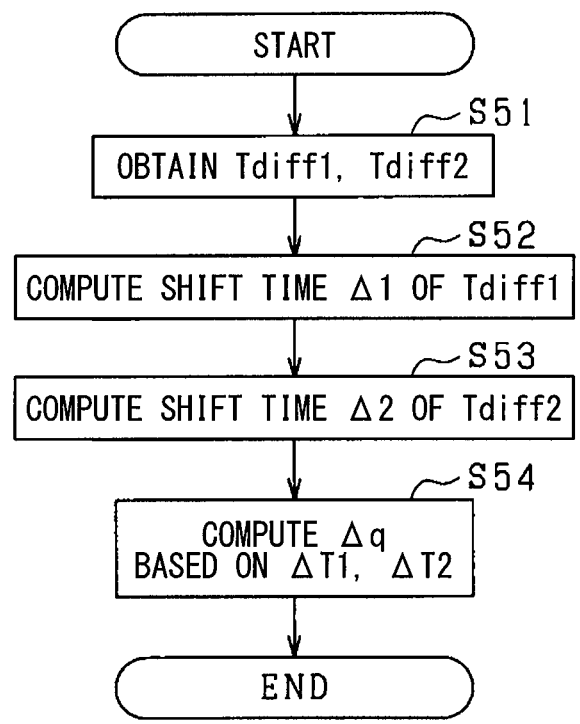
FIG. 9 is a flowchart illustrating injection amount learning processing.

In the injection amount learning processing illustrated in FIG. 9, the electromotive force measurement time Tdiff1 and the voltage inflection point time Tdiff2 respectively calculated by the processing of FIG. 7 and the processing of FIG. 8 are acquired in step S51. Then, a shift of the electromotive force measurement time Tdiff1 from a reference value of a preliminarily determined injection property is calculated as a shift time ΔT1 in step S52, and a shift of the voltage inflection point time Tdiff2 from the reference value of the preliminarily determined injection property is calculated as a shift time ΔT2 in step S53. The shift times ΔT1, ΔT2 correspond to "shift correction values".

In step S54, the injection amount learning value Δq is calculated using the shift times ΔT1, ΔT2, and the Δq is stored in a backup memory (non-volatile storage area) to correspond to the fuel injection amount (injection pulse width is also possible) that is learned this time.

Figure 10:
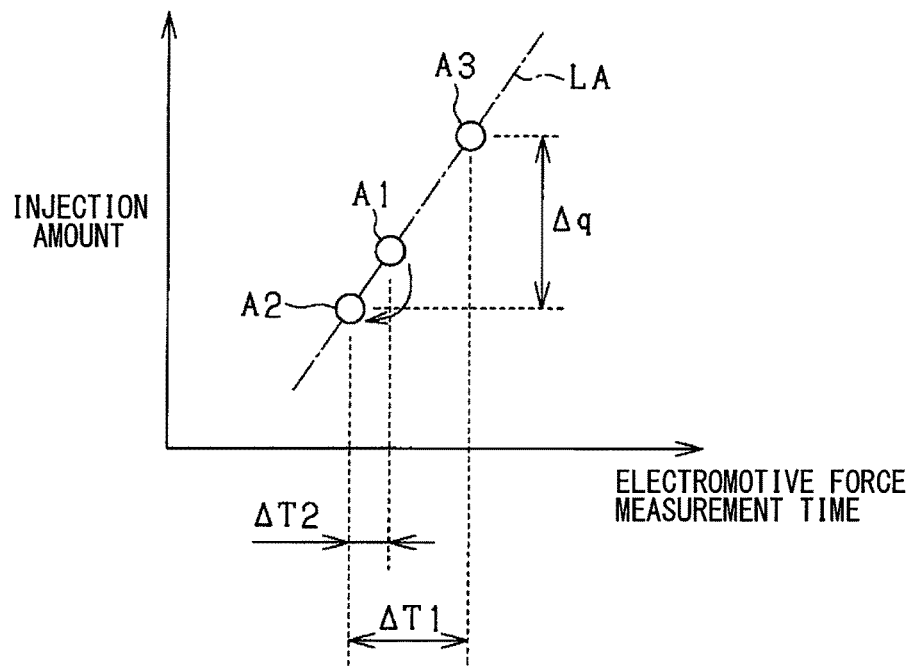
FIG. 10 is a diagram for illustrating calculation of an injection amount learning value Δq.

Calculation of the injection amount learning value Δq will be described using FIG. 10. FIG. 10 illustrates a correlation between the electromotive force measurement time Tdiff1 and the injection amount, and A1 denotes an initial characteristic point as a given characteristic point. Furthermore, FIG. 10 illustrates a characteristic line LA indicating the correlation of the injection amount with respect to the electromotive force measurement time Tdiff1 as a primary straight line. The given characteristic point may be other than the initial value, and may be a previous value that has been already calculated.

In this case, the initial characteristic point A1 is shifted on the characteristic line LA by the shift time ΔT2 calculated on the basis of the voltage inflection point time Tdiff2, and A2 that is a first characteristic point is obtained. Using the A2 as a reference, a correction point A3 that is a second characteristic point is obtained on the characteristic line LA using the shift time ΔT1 calculated on the basis of the electromotive force measurement time Tdiff1. The difference of the injection amount between A2 that is shifted from the initial characteristic point A1 and the correction point A3 is calculated as the injection amount learning value Δq.

Figure 11:
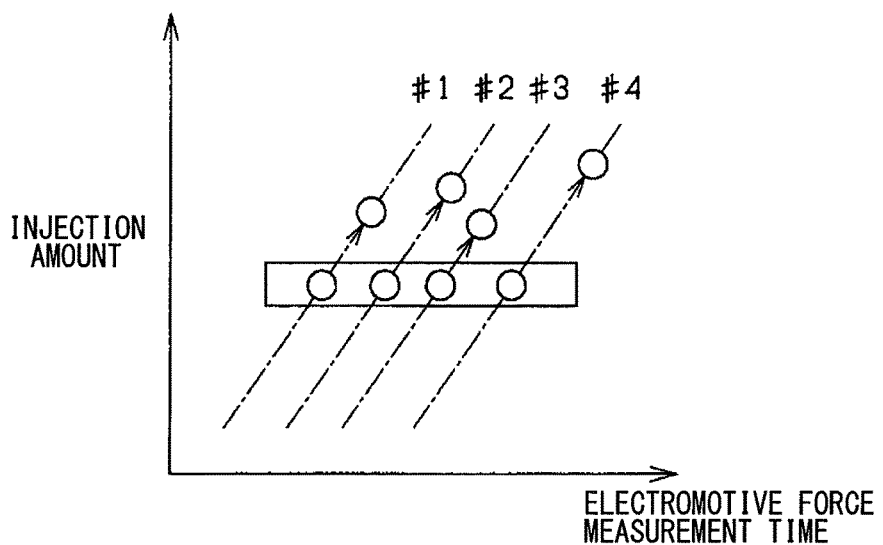
FIG. 11 is a diagram for illustrating an injection amount correction for each cylinder.

The injection property is given for each cylinder of the engine 11, and the injection amount learning is performed for each cylinder. In this case, as illustrated in FIG. 11, the injection amount learning value Δq is preferably calculated for each cylinder of the engine 11.

According to the present embodiment described in detail, the following superior advantages can be obtained.

By calculation methods of different types, the electromotive force measurement time Tdiff1 (first parameter) correlated with the induced electromotive force amount and the voltage inflection point time Tdiff2 (second parameter)

correlated with the voltage inflection point are calculated, and the time length of the injection pulse is corrected on the basis of the Tdiff1 and the Tdiff2. Combining the correction based on the voltage inflection point time Tdiff2 in this manner makes it possible to suppress the problem in the case where correction is performed on the basis of the electromotive force measurement time Tdiff1. That is, in the correction based on the electromotive force measurement time Tdiff1, there is a concern of lowering in accuracy due to variation by tolerance of the magnetic circuit or the driving circuit, but the above-mentioned lowering in accuracy can be suppressed by combining the correction based on the voltage inflection point time Tdiff2. This makes it possible to control fuel injection amount with a high accuracy in the partial lift injection.

The negative terminal voltage Vm is subjected to filter processing by each of the first low pass filter and the second low pass filter to calculate the first filter voltage Vsm1 and the second filter voltage Vsm2, and on the basis of the difference Vdiff1 that is the difference between the first filter voltage Vsm1 and the second filter voltage Vsm2, the electromotive force measurement time Tdiff1 is calculated. In this case, in the state where the induced electromotive force is superimposed with the negative terminal voltage Vm, the first parameter (Tdiff1) correlated with the induced electromotive force amount can be easily and appropriately calculated.

Furthermore, the difference Vdiff1 is subjected to filter processing using each of the third low pass filter and the fourth low pass filter to calculate the third filter voltage Vdiff.sm3 and the fourth filter voltage Vdiff.sm4, and on the basis of the second order difference Vdiff2 that is the difference between the third filter voltage Vdiff.sm3 and the fourth filter voltage Vdiff.sm4, the voltage inflection point time Tdiff2 is calculated. In this case, the second parameter (Tdiff2) correlated with the voltage inflection point can be easily and appropriately calculated depending on a time series change of the induced electromotive force.

The injection amount learning value Δq with respective to an initial characteristic value of the injection amount is calculated by using the shift time ΔT1 calculated using the electromotive force measurement time Tdiff1 and the shift time ΔT2 calculated using the voltage inflection point time Tdiff2 as correction values. This makes it possible to appropriately sense the deviation of the injection amount with respect to the initial characteristic value of the injection amount to thereby improve accuracy of fuel injection amount control.

The relation between the electromotive force measurement time Tdiff1 and the injection amount of the fuel injection valve 30 is preliminarily set as the characteristic line LA, and the injection amount learning value Δq is calculated while converting the shift times ΔT1, ΔT2 respectively corresponding to the parameters (Tdiff1, Tdiff2) into flow rates using the characteristic line LA. In this case, defining the characteristic line LA for each engine makes it possible to appropriately calculate the injection amount learning value Δq also in any engine.

The calculation processing of the electromotive force measurement time Tdiff1 and the calculation processing of voltage inflection point time Tdiff2 are performed at an OFF time of the same injection pulse. That is, the difference Vdiff1 (equivalent value of the induced electromotive force amount) calculated on the basis of the negative terminal voltage Vm in the calculation processing of the electromotive force measurement time Tdiff1 is used for the calculation of the electromotive force measurement time Tdiff1 (first parameter), and is used for the calculation of the voltage inflection point time Tdiff2 (second parameter) in the calculation processing of the voltage inflection point time Tdiff2 performed at the same time in parallel with the calculation of the electromotive force measurement time Tdiff1 (first parameter). In this case, the learning accuracy of injection amount variation can be enhanced by calculating each parameter (Tdiff1, Tdiff2) using the same terminal voltage data.

Other Embodiments

The above-mentioned embodiment can be modified as described below.

In the above embodiment, the calculation processing of the electromotive force measurement time Tdiff1 (FIG. 7) and the calculation processing of the voltage inflection point time Tdiff2 (FIG. 8) are performed at the same time on the basis of OFF of the same injection pulse, but this can be modified. When the above-mentioned two processing cannot be performed at the same time due to a circumstance of computing load or the like, for example, the calculation processing of the voltage inflection point time Tdiff2 is performed first, and then, the calculation processing of the electromotive force measurement time Tdiff1 is performed.

Variation in the valve body lift amount in the fuel injection valve 30 provably occurs mainly due to a temporal factor. Variation in valve closing timing provably occurs due to individual difference of the magnetic circuit or the driving circuit. In view of these points, the calculation of the voltage inflection point time Tdiff2 corresponding to the variation in valve closing timing may be performed as an initial learning when, for example, shipped from a factory, and the calculation of the electromotive force measurement time Tdiff1 corresponding to the variation in valve body lift amount may be performed periodically at a predetermined cycle.

The cycle of the calculation of the electromotive force measurement time Tdiff1 and the cycle of the calculation of the voltage inflection point time Tdiff2 may be separately set. In this case, the cycle of the former is preferably set shorter than the cycle of the latter.

In the above-mentioned embodiment, when the electromotive force measurement time Tdiff1 is calculated as the first parameter, although the difference between the first filter voltage Vsm1 calculated by the filter processing of the first low pass filter and the second filter voltage Vsm2 calculated by the filter processing of the second low pass filter is calculated as the difference Vdiff1, this may be modified. For example, the difference between the negative terminal voltage Vm and the second filter voltage Vsm2 may be calculated as the difference Vdiff1. In conclusion, it is sufficient that the difference between a non-smoothed value of the terminal voltage Vm that is not subjected to the first smoothing processing (filter processing of the second low pass filter) and a smoothed value of the terminal voltage Vm that is subjected to the first smoothing processing is calculated as the difference Vdiff1 (first order difference), and the electromotive force measurement time Tdiff1 is calculated on the basis of the difference Vdiff1.

In the above embodiment, when the voltage inflection point time Tdiff2 is calculated as the second parameter, although the difference between the third filter voltage Vdiff.sm3 calculated by the filter processing of the third low pass filter and the fourth filter voltage Vdiff.sm4 calculated by the filter processing of the fourth low pass filter is calculated as the second order difference Vdiff2, this may be modified. For example, the difference between the difference Vdiff1 and the fourth filter voltage Vdiff.sm4 may be calculated as the second order difference Vdiff2. In conclusion, it is sufficient that the difference between a non-smoothed value of the difference Vdiff1 that is not subjected to the second smoothing processing (filter processing of the fourth low pass filter) and a smoothed value of the difference Vdiff1 that is subjected to the second smoothing processing is calculated as the second order difference Vdiff2, and the voltage inflection point time Tdiff2 is calculated on the basis of the second order difference Vdiff2.

To provide smoothing processing, means other than the low pass filter may be used. For example, means of moving average, differential processing, or the like may be used.

As the terminal voltage of the fuel injection valve 30, a positive terminal voltage may be detected instead of the negative terminal voltage.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A fuel injection control device for an internal combustion engine equipped with a fuel injection valve of an electromagnetically driven type, the fuel injection control device comprising:

an injection controller that performs a partial lift injection in which the fuel injection valve is drivingly opened by an injection pulse by which a lift amount of a valve body of the fuel injection valve does not reach a full lift position;

a first calculation section that calculates a first parameter correlated with an amount of induced electromotive force generated by a magnetic flux change during movement of the valve body to a closed position after OFF of the injection pulse of the partial lift injection;

a second calculation section that calculates, based on a time-series change of the induced electromotive force after OFF of the injection pulse of the partial lift injection, a second parameter correlated with a voltage inflection point generated with reaching of the valve body to the closed position; and a correction section that corrects a time length of the injection pulse, based on the first parameter and the second parameter.

2. The fuel injection control device for an internal combustion engine according to claim 1, further comprising an acquisition unit that acquires a terminal voltage of the fuel injection valve, wherein the first calculation section subjects the terminal voltage to predetermined first smoothing processing, calculates a difference between a non-smoothed value of the terminal voltage that is not subjected to the first smoothing processing and a smoothed value of the terminal voltage that is subjected to the first smoothing processing as a first order difference, and calculates the first parameter based on the first order difference; and the second calculation section subjects the first order difference to predetermined second smoothing processing, calculates a difference between a non-smoothed value of the first order difference that is not subjected to the second smoothing processing and a smoothed value of the first order difference that is subjected to the second smoothing processing as a second order difference, and calculates the second parameter based on the second order difference.

3. The fuel injection control device for an internal combustion engine according to claim 1, wherein the correction section calculates, based on the first parameter, a shift correction value with respect to a reference value of an injection property that is preliminarily obtained, calculates, based on the second parameter, a shift correction value with respect to the reference value of the injection property, and calculates, based on the shift correction values, a pulse correction value for correcting the time length of the injection pulse.

4. The fuel injection control device for an internal combustion engine according to claim 1, wherein the correction section obtains a first characteristic point by shifting an given characteristic point based on the second parameter on a characteristic line determined by a correlation between the first parameter and a fuel injection amount, obtains a second characteristic point based on the first parameter with the first characteristic point as a reference, and calculates a pulse correction value for correcting the time length of the injection pulse using the first characteristic point and the second characteristic point.

5. The fuel injection control device for an internal combustion engine according to claim 1, further comprising an acquisition unit that acquires a terminal voltage of the fuel injection valve, wherein the first calculation section calculates an equivalent value of the induced electromotive force amount based on the terminal voltage and calculates the first parameter based on the equivalent value of the induced electromotive force amount; and the second calculation section calculates, at the same time when the first calculation section calculates the first parameter, the second parameter using the equivalent value of the induced electromotive force amount calculated by the first calculation section.

* * * * *